United States Patent
Hsu et al.

(10) Patent No.: US 11,658,768 B2
(45) Date of Patent: May 23, 2023

(54) WIRELESS FIDELITY MULTI-LINK DEVICE WITH DYNAMIC OPERATION MODE SWITCH AND ASSOCIATED METHOD

(71) Applicant: MEDIATEK INC., Hsin-Chu (TW)

(72) Inventors: Chien-Fang Hsu, Hsinchu (TW); Cheng-Yi Chang, Hsinchu (TW); Hung-Tao Hsieh, Hsinchu (TW); Yongho Seok, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/367,437

(22) Filed: Jul. 5, 2021

(65) Prior Publication Data
US 2022/0014305 A1    Jan. 13, 2022

Related U.S. Application Data

(60) Provisional application No. 63/048,733, filed on Jul. 7, 2020.

(51) Int. Cl.
*H04L 1/00* (2006.01)
*H04B 7/06* (2006.01)
*H04W 80/02* (2009.01)
*H04W 84/12* (2009.01)

(52) U.S. Cl.
CPC ......... *H04L 1/0017* (2013.01); *H04B 7/0632* (2013.01); *H04W 80/02* (2013.01); *H04W 84/12* (2013.01)

(58) Field of Classification Search
CPC .... H04L 1/0017; H04B 7/0632; H04W 80/02; H04W 84/12

USPC .......................................... 370/310, 328, 338
See application file for complete search history.

(56) References Cited

U.S. PATENT DOCUMENTS

| | | | |
|---|---|---|---|
| 2010/0080173 A1 | 4/2010 | Takagi | |
| 2019/0364555 A1 | 11/2019 | Huang | |
| 2021/0045095 A1* | 2/2021 | Cariou | H04W 76/15 |
| 2021/0144698 A1* | 5/2021 | Kwon | H04W 28/0215 |

(Continued)

FOREIGN PATENT DOCUMENTS

| | | |
|---|---|---|
| CN | 102422690 A | 4/2012 |
| CN | 107005894 A | 8/2017 |

(Continued)

OTHER PUBLICATIONS

Yongho Seok et al., Multi-link Spatial Multiplexing, IEEE 802.11-20/0883r0, Jul. 2, 2020, pp. 1-14, XP068169740.

(Continued)

*Primary Examiner* — Obaidul Huq
(74) *Attorney, Agent, or Firm* — Winston Hsu

(57) ABSTRACT

A multi-link device (MLD) includes a transmit (TX) circuit, a receive (RX) circuit, and a control circuit. The control circuit controls the RX circuit to receive a first frame under an operation mode parameter with a first setting, control the TX circuit to transmit a second frame responsive to the first frame under the operation mode parameter with the first setting, and after the second frame is transmitted, controls the RX circuit to receive at least one physical layer protocol data unit (PPDU) under the operation mode parameter with a second setting, wherein the second setting is different from the first setting.

18 Claims, 14 Drawing Sheets

(56) References Cited

U.S. PATENT DOCUMENTS

2021/0195578 A1* 6/2021 Huang ................ H04W 72/048
2022/0225406 A1* 7/2022 Kim .................. H04W 74/0816

FOREIGN PATENT DOCUMENTS

EP      3 914 017 A1    11/2021
WO      2010/107165 A1   9/2010

OTHER PUBLICATIONS

Jeongki Kim et al., "EHT Power saving considering multi-link", IEEE 802.11-19/1510r6,2019/09/15,Slide 1-16. (https://mentor.ieee.org/802.11/dcn/19/11-19-1510-00be-eht-power-saving-considering-multi-link.pptx).
Yongho Seok et al., "Multi-link Spatial Multiplexing", IEEE-SA Mentor, Piscataway, IEEE 802.11-20/0883r4, Aug. 12, 2020, pp. 1-14.

* cited by examiner

WIRELESS FIDELITY MULTI-LINK DEVICE WITH DYNAMIC OPERATION MODE SWITCH AND ASSOCIATED METHOD

CROSS REFERENCE TO RELATED APPLICATIONS

This application claims the benefit of U.S. provisional application No. 63/048,733, filed on Jul. 7, 2020 and incorporated herein by reference.

BACKGROUND

The present invention relates to wireless communications, and more particularly, to a wireless fidelity (Wi-Fi) multi-link device (MLD) with dynamic operation mode switch and an associated method.

In a Wi-Fi multi-link operation, there exists several links between two Wi-Fi MLDs, including one access point (AP) and one non-AP station (STA), that occupy different radio-frequency (RF) bands. One Wi-Fi MLD can perform channel access (e.g., enhanced distributed channel access (EDCA)) on multiple wireless links independently. Specifically, these wireless links can operate independently to increase the overall throughput and/or to improve the connection stability. For example, one Wi-Fi MLD may have one spatial stream specified on one wireless link. If a wireless link can use more resources to transmit or receive during a specific period, the performance of the wireless link can be improved. Thus, there is a need for an innovative design which is capable of dynamically changing operation mode parameter(s) of a Wi-Fi MLD.

SUMMARY

One of the objectives of the claimed invention is to provide a wireless fidelity (Wi-Fi) multi-link device (MLD) with dynamic operation mode switch and an associated method.

According to a first aspect of the present invention, an exemplary wireless fidelity (Wi-Fi) multi-link device (MLD) is disclosed. The exemplary MLD includes a transmit (TX) circuit, a receive (RX) circuit, and a control circuit. The control circuit is arranged to control the RX circuit to receive a first frame under an operation mode parameter with a first setting, control the TX circuit to transmit a second frame responsive to the first frame under the operation mode parameter with the first setting, and after the second frame is transmitted, control the RX circuit to receive at least one physical layer protocol data unit (PPDU) under the operation mode parameter with a second setting, wherein the second setting is different from the first setting.

According to a second aspect of the present invention, an exemplary wireless fidelity (Wi-Fi) multi-link device (MLD) is disclosed. The MLD includes a transmit (TX) circuit, a receive (RX) circuit, and a control circuit. The control circuit is arranged to control the TX circuit to transmit a first frame under an operation mode parameter with a first setting, control the RX circuit to receive a second frame responsive to the first frame under the operation mode parameter with the first setting, and after the second frame is received, control the TX circuit to transmit at least one physical layer protocol data unit (PPDU) under the operation mode parameter with a second setting, wherein the second setting is different from the first setting.

According to a third aspect of the present invention, an exemplary wireless communication method employed by a wireless fidelity (Wi-Fi) multi-link device (MLD) is disclosed. The exemplary wireless communication method includes: controlling a receive (RX) circuit to receive a first frame under a first operation mode parameter with a first setting; controlling a transmit (TX) circuit to transmit a second frame responsive to the first frame under the first operation mode parameter with the first setting; after the second frame is transmitted, controlling the RX circuit to receive at least one physical layer protocol data unit (PPDU) under the first operation mode parameter with a second setting, wherein the second setting is different from the first setting; controlling the TX circuit to transmit a third frame under a second operation mode parameter with a third setting; controlling the RX circuit to receive a fourth frame responsive to the third frame under the second operation mode parameter with the third setting; and after the fourth frame is received, controlling the TX circuit to transmit at least one PPDU under the second operation mode parameter with a fourth setting, wherein the fourth setting is different from the third setting.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
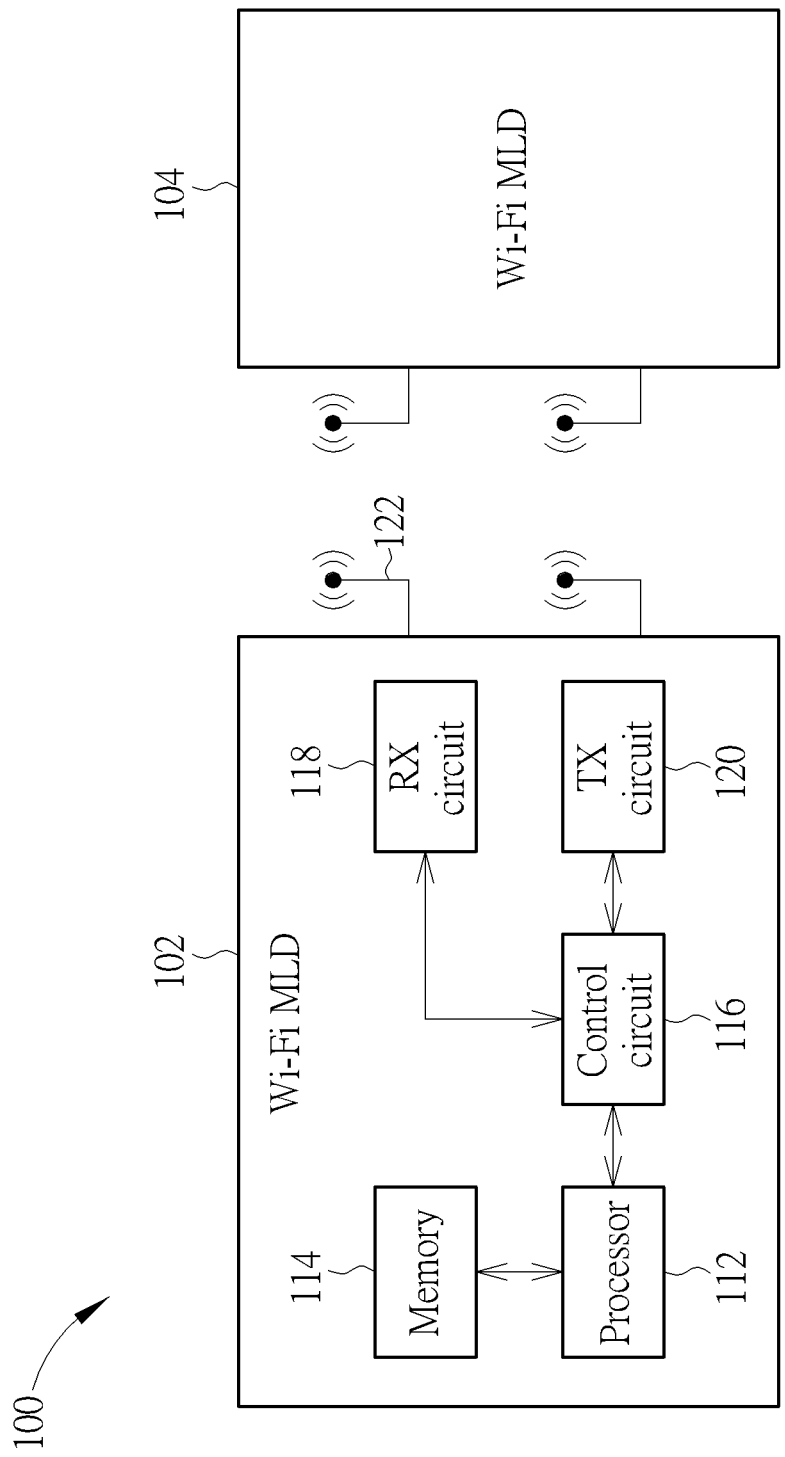
FIG. 1 is a diagram illustrating a wireless fidelity (Wi-Fi) communication system according to an embodiment of the present invention.

FIG. 1 is a diagram illustrating a wireless fidelity (Wi-Fi) communication system according to an embodiment of the present invention. The Wi-Fi communication system 100 has a plurality of Wi-Fi multi-link devices (MLDs) 102 and 104, including an access point (AP) and a non-AP station (STA). For example, the Wi-Fi MLD 104 may be an AP, and the Wi-Fi MLD 102 may be a non-AP STA. For brevity and simplicity, only two Wi-Fi MLDs are shown in FIG. 1. In practice, the Wi-Fi communication system 100 is allowed to have more than two Wi-Fi MLDs, including an AP and more than one non-AP STA in the same basic service set (BSS). By way of example, but not limitation, both of Wi-Fi MLDs 102 and 104 may be in compliance with IEEE 802.11be standard.

As shown in FIG. 1, the Wi-Fi MLD 102 includes a processor 112, a memory 114, a control circuit 116, a receive (RX) circuit 118, a transmit (TX) circuit 120, and multiple antennas 122. The memory 114 is arranged to store a program code. The processor 112 is arranged to load and execute the program code to manage the Wi-Fi MLD 102. The control circuit 116 is arranged to control wireless communications with the Wi-Fi MLD 104. Considering a case where the Wi-Fi MLD 102 is a non-AP STA and the Wi-Fi MLD 104 is an AP, the control circuit 116 controls the TX circuit 120 to deal with uplink (UL) traffic between AP and non-AP STA, and controls the RX circuit 118 to deal with downlink (DL) traffic between AP and non-AP STA. Due to inherent characteristics of Wi-Fi MLD 102, the TX circuit 120 includes multiple TX chains, and the RX circuit 118 includes multiple RX chains. In this embodiment, the Wi-Fi MLD 102 is equipped with dynamic operation mode switch functionality.

Regarding DL traffic between AP and non-AP STA, the control circuit 116 is arranged to control the RX circuit 118 to receive a first frame under an operation mode parameter with a first setting (e.g., default setting), control the TX circuit 120 to transmit a second frame responsive to the first frame under the operation mode parameter with the first setting, and after the second frame is transmitted, control the RX circuit 118 to receive at least one DL physical layer protocol data unit (PPDU) under the operation mode parameter with a second setting (e.g., maximum setting or non-default setting) during a remaining period of a transmission opportunity (TXOP), wherein the second setting is different from the first setting. In addition, the control circuit 116 is further arranged to control the RX circuit 118 to resume the operation mode parameter with the first setting (e.g., default setting) at an end of the TXOP.

In one exemplary mode switch design, the first frame may be a request to send (RTS) frame, and the second frame may be a clear to send (CTS) frame responsive to the RTS frame, where the RTS frame does not carry any indication of operation mode parameter change, and the CTS frame may or may not carry indication of operation mode parameter change that specifies the use of the second setting. When the CTS frame does not carry any indication of operation mode parameter change, the CTS frame may act as indication of using the maximum setting for the operation mode parameter (i.e., second setting=maximum setting).

In another exemplary mode switch design, the first frame may be an RTS frame, and the second frame may be a CTS frame responsive to the RTS frame, where the CTS frame does not carry any indication of operation mode parameter change, and the RTS frame may or may not carry indication of operation mode parameter change that specifies the use of the second setting. When the RTS frame does not carry any indication of operation mode parameter change, the RTS frame may act as indication of using the maximum setting for the operation mode parameter (i.e., second setting=maximum setting).

In yet another exemplary mode switch design, the first frame may be an inquiry frame transmitted after RTS/CTS handshaking is done, and the second frame may be a response frame responsive to the inquiry frame, where the response frame is particularly designed to carry indication of operation mode parameter change that specifies the use of the second setting (e.g., maximum setting or non-default setting).

Regarding UL traffic between AP and non-AP STA, the control circuit 116 is arranged to control the TX circuit 120 to transmit a first frame under an operation mode parameter with a first setting (e.g., default setting), control the RX circuit 118 to receive a second frame responsive to the first frame under the operation mode parameter with the first setting, and after the second frame is received, control the TX circuit 120 to transmit at least one UL PPDU under the operation mode parameter with a second setting (e.g., maximum setting or non-default setting) during a remaining period of a TXOP, wherein the second setting is different from the first setting. In addition, the control circuit 116 is further arranged to control the TX circuit 120 to resume the operation mode parameter with the first setting (e.g., default setting) at an end of the TXOP.

The Wi-Fi MLD 102 can have different operation modes on each link established between Wi-Fi MLDs 102 and 104. In some embodiments of the present invention, the operation mode parameter allowed to be dynamically switched may be the number of spatial streams (NSS), the bandwidth, the decoding capability (e.g., modulation and coding scheme (MCS)), the maximum media access control protocol data unit (MPDU) length, the maximum aggregate media access control service data unit (A-MSDU) length, or the maximum aggregate media access control protocol data unit (A-MPDU) length exponent. For example, a default bandwidth may be set by 80 megahertz (MHz), and a maximum bandwidth may be set by 160 MHz. For another example, a default decoding capability may cover MCS0-MCS3 only, and a maximum decoding capability may cover all MCSs. For yet another example, the default maximum MPDU length may be set by 8K on each link, and the maximum MPDU length may be set by 11K.

For better understanding of technical features of the proposed dynamic operation mode switch scheme, several examples are provided as below.

Figure 2:
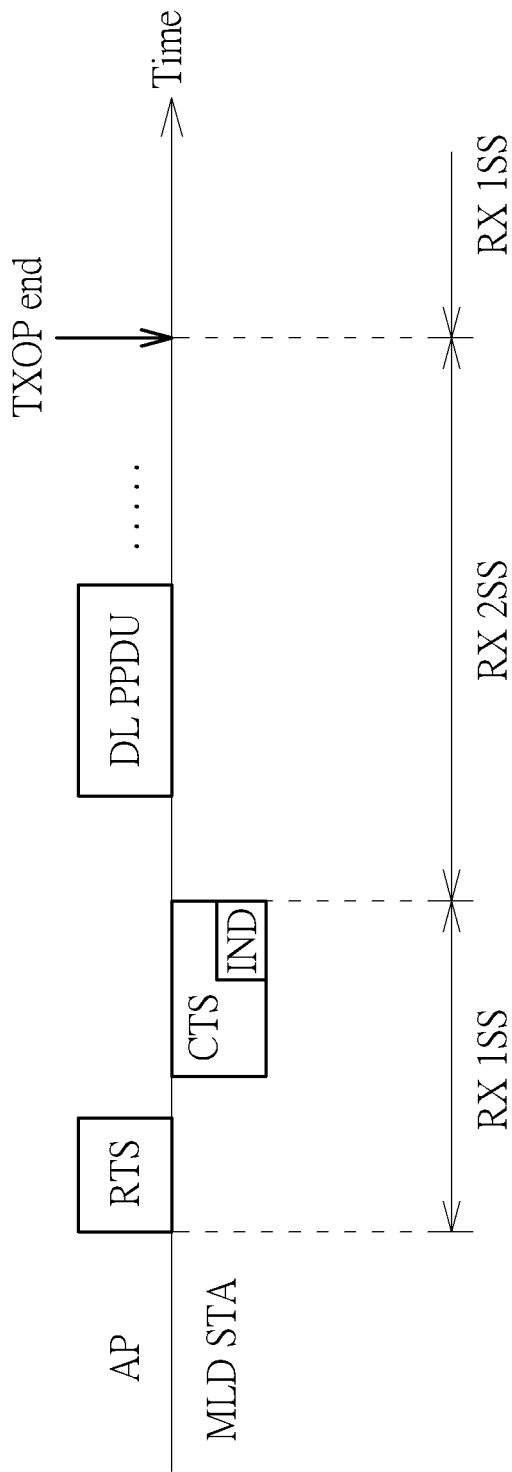
FIG. 2 is a diagram illustrating a first dynamic operation mode switch scenario according to an embodiment of the present invention.

FIG. 2 is a diagram illustrating a first dynamic operation mode switch scenario according to an embodiment of the present invention. In this embodiment, the Wi-Fi MLD 104 may be an AP, the Wi-Fi MLD 102 may be a non-AP STA, and the Wi-Fi MLD 102 on a link may set a default receive (RX) NSS=1 and a maximum RX NSS=4. On each link, the Wi-Fi MLD 102 operates under a default mode listening to the channel. The control circuit 116 controls the RX circuit 118 to receive an RTS frame from Wi-Fi MLD (which is an AP) 104, where the RTS frame is sent to initialize a TXOP. After the RX circuit 118 receives the RTS frame on a link, the control circuit 116 controls the TX circuit 120 to respond with a CTS frame on the same link, where the RTS/CTS mechanism claims the TXOP for frame exchange. The RTS frame is received based on a default operation mode parameter (e.g., RX NSS=1). In this embodiment, the CTS frame carries indication IND of operation mode parameter change that specifies the use of RX NSS=2. In other words, the Wi-Fi MLD 102 will control the RX circuit 118 to switch another RX chain to the link for enhancing the RX NSS capability. After the CTS frame is transmitted by the TX circuit 120, the control circuit 116 controls the RX circuit 118 to operate under a changed operation mode parameter (e.g., RX NSS=2) and other unchanged parameters, and receive one or more DL PPDUs on the link during a remaining period of the TXOP. Hence, during the remaining period of the TXOP, DL PPDU(s) can be received by RX NSS=2. At an end of the TXOP, the control circuit 116 controls the RX circuit 118 to resume the default operation mode parameter (e.g., RX NSS=1) on the link. It should be noted that, if the CTS frame does not carry any indication of operation mode parameter change, the maximum setting (e.g., RX NSS=4) is inferred from such a CTS frame.

Figure 3:
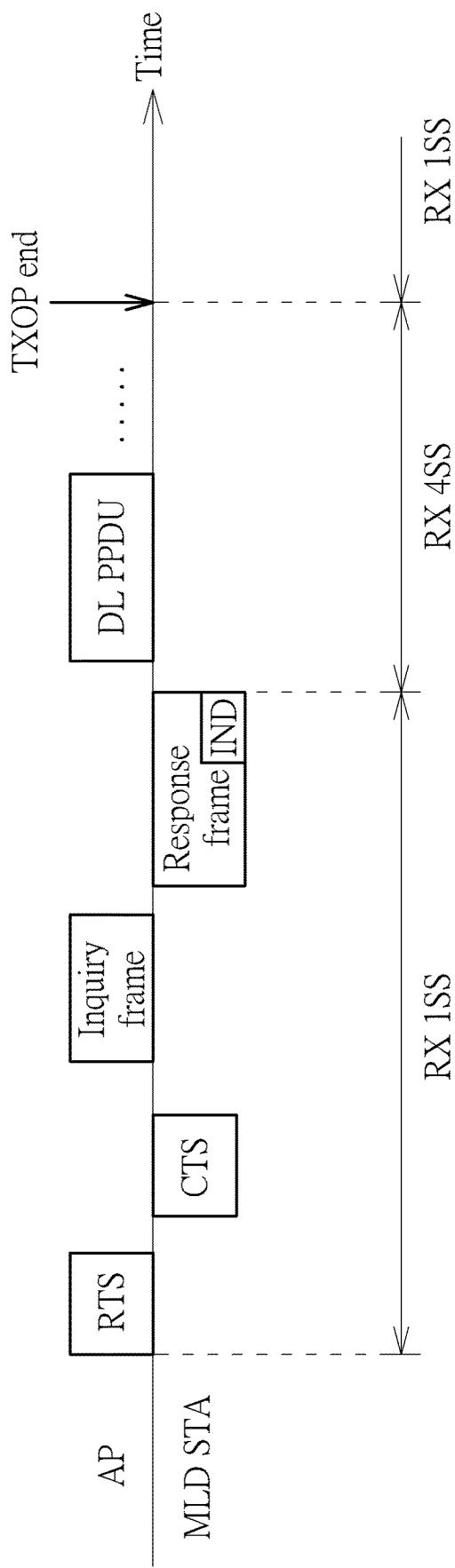
FIG. 3 is a diagram illustrating a second dynamic operation mode switch scenario according to an embodiment of the present invention.

FIG. 3 is a diagram illustrating a second dynamic operation mode switch scenario according to an embodiment of the present invention. In this embodiment, the Wi-Fi MLD 104 may be an AP, the Wi-Fi MLD 102 may be a non-AP STA, and the Wi-Fi MLD 102 on a link may set a default RX NSS=1 and a maximum RX NSS=4. On each link, the Wi-Fi MLD 102 operates under a default mode listening to the channel. The control circuit 116 controls the RX circuit 118 to receive an RTS frame from Wi-Fi MLD (which is an AP) 104, where the RTS frame is sent to initialize a TXOP. After the RX circuit 118 receives the RTS frame on a link, the control circuit 116 controls the TX circuit 120 to respond with a CTS frame on the same link, where the RTS/CTS mechanism claims a TXOP for frame exchange. After the CTS frame is transmitted by the TX circuit 120, the RX circuit 118 receives an inquiry frame sent from Wi-Fi MLD (which is an AP) 104, where the inquiry frame is used to make an inquiry about possible operation mode change for the following period of the TXOP on the link. The TX circuit 120 sends back a response frame after the inquiry frame is received by the RX circuit 118. The RTS frame and the inquiry frame are both received based on a default operation mode parameter (e.g., RX NSS=1). In this embodiment, the response frame carries indication IND of operation mode parameter change that specifies the use of RX NSS=4. In other words, the Wi-Fi MLD 102 will control the RX circuit 118 to switch other RX chains to the link for achieving its maximum RX NSS capability. After the response frame is transmitted by the TX circuit 120, the control circuit 116 controls the RX circuit 118 to operate under a changed operation mode parameter (e.g., RX NSS=4) and other unchanged parameters, and receive one or more DL PPDUs on the link during a remaining period of the TXOP. Hence, during the remaining period of the TXOP, DL PPDU(s) can be received by RX NSS=4. At an end of the TXOP, the control circuit 116 controls the RX circuit 118 to resume the default operation mode parameter (e.g., RX NSS=1) on the link.

Figure 4:
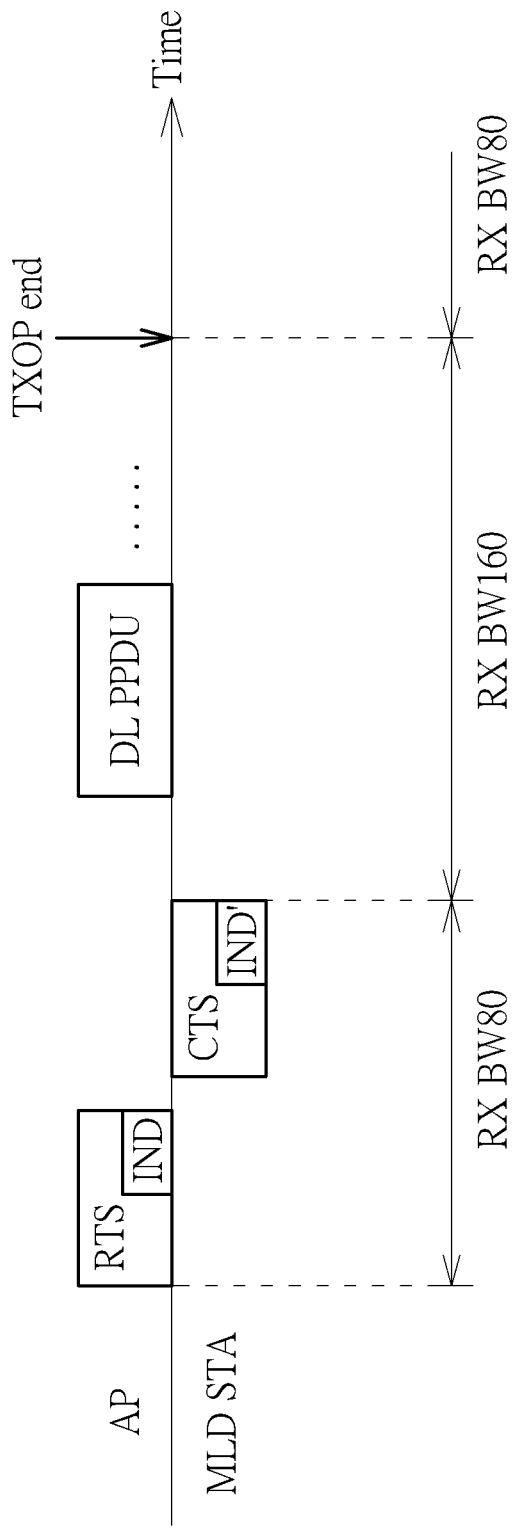
FIG. 4 is a diagram illustrating a third dynamic operation mode switch scenario according to an embodiment of the present invention.

FIG. 4 is a diagram illustrating a third dynamic operation mode switch scenario according to an embodiment of the present invention. In this embodiment, the Wi-Fi MLD 104 may be an AP, the Wi-Fi MLD 102 may be a non-AP STA, and the Wi-Fi MLD 102 on a link may set a default bandwidth (BW)=80 MHz and a maximum BW=160 MHz. On each link, the Wi-Fi MLD 102 operates under a default mode listening to the channel. The control circuit 116 controls the RX circuit 118 to receive an RTS frame from Wi-Fi MLD (which is an AP) 104, where the RTS frame is sent to initialize a TXOP, and also carries indication IND of operation mode parameter change that specifies the use of BW=160 MHz. After the RTS frame is received by the RX circuit 118, the control circuit 116 controls the TX circuit 120 to respond with a CTS frame on the same link, where the RTS/CTS mechanism claims a TXOP for frame exchange, and the CTS frame also carries indication IND' about accepting the request of operation mode parameter change or rejecting the request of operation mode parameter change. The RTS frame is received based on the default operation mode parameter (e.g., BW=80 MHz). If the control circuit 116 accepts the request of operation mode parameter change, the control circuit 116 controls the RX circuit 118 to change the BW to 160 MHz on the link. In other words, the control circuit 116 controls the RX circuit 118 to operate under a changed operation mode parameter (e.g., BW=160 MHz) and other unchanged parameters, and receive one or more DL PPDUs on the link during a remaining period of the TXOP. Hence, during the remaining period of the TXOP, DL PPDU(s) can be received by BW=160 MHz. At an end of the TXOP, the control circuit 116 controls the RX circuit 118 to resume the default operation mode parameter (e.g., BW=80 MHz) on the link.

Figure 5:
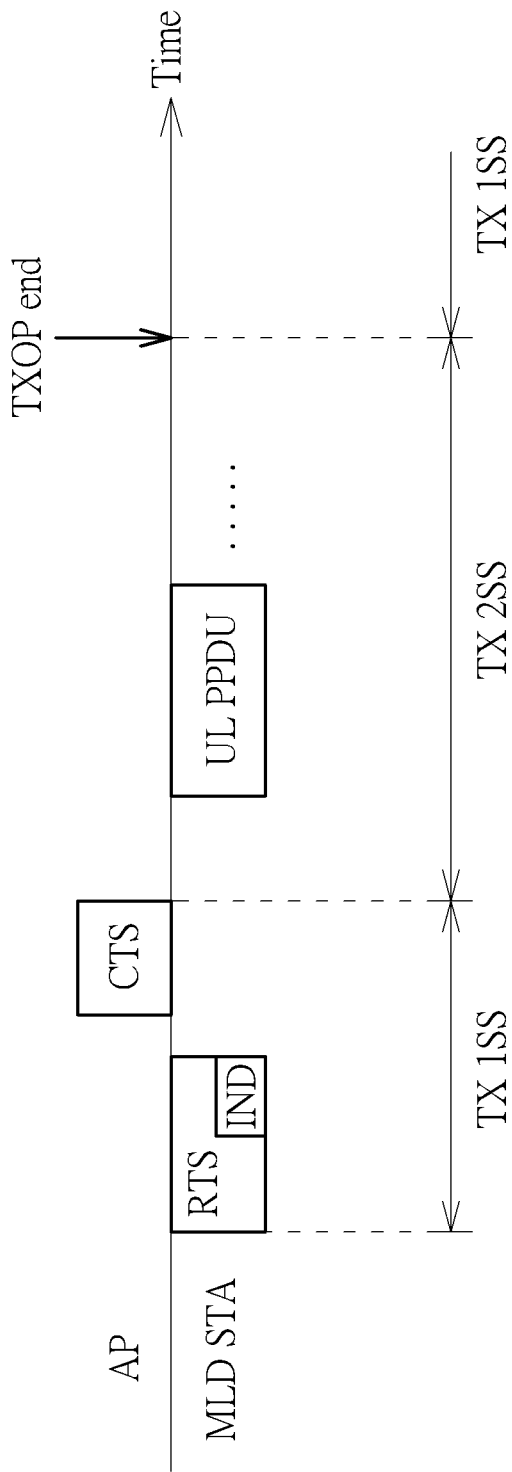
FIG. 5 is a diagram illustrating a fourth dynamic operation mode switch scenario according to an embodiment of the present invention.

FIG. 5 is a diagram illustrating a fourth dynamic operation mode switch scenario according to an embodiment of the present invention. In this embodiment, the Wi-Fi MLD 104 may be an AP, the Wi-Fi MLD 102 may be a non-AP STA, and the Wi-Fi MLD 102 on a link may set a default transmit (TX) NSS=1 and a maximum TX NSS=4. On each link, the Wi-Fi MLD 102 operates under a default mode listening to the channel. The control circuit 116 controls the TX circuit 120 to transmit an RTS frame on a link to initialize a TXOP. The RTS frame is transmitted based on the default operation mode parameter (e.g., TX NSS=1). In this embodiment, the RTS frame carries indication IND of operation mode parameter change that specifies the use of TX NSS=2. In other words, the Wi-Fi MLD 102 will control the TX circuit 120 to switch another TX chain to the link for enhancing the TX NSS capability. The RX circuit 118 receives a CTS frame responsive to the RTS frame from Wi-Fi MLD (which is an AP) 104 on the same link, where the RTS/CTS mechanism claims a TXOP for frame exchange. After the CTS frame is received by the RX circuit 118, the control circuit 116 controls the TX circuit 120 to operate under a changed operation mode parameter (e.g., TX NSS=2) and other unchanged parameters, and transmit one or more UL PPDUs on the link during a remaining period of the TXOP. Hence, during the remaining period of the TXOP, UL PPDU(s) can be transmitted by TX NSS=2. At an end of the TXOP, the control circuit 116 controls the TX circuit 120 to resume the default operation mode parameter (e.g., TX NSS=1) on the link.

Figure 6:
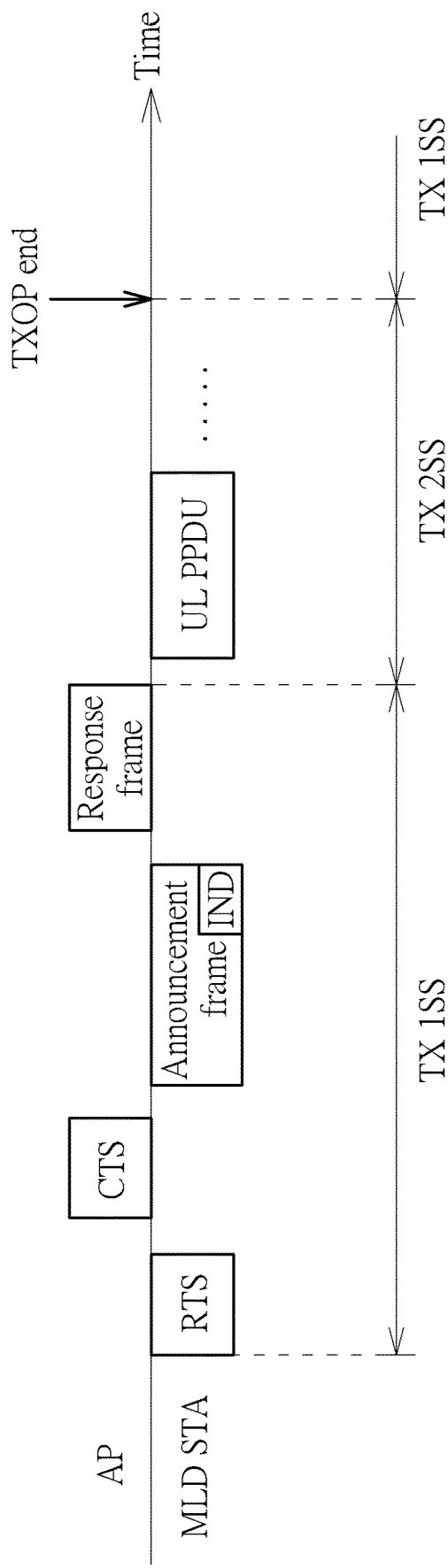
FIG. 6 is a diagram illustrating a fifth dynamic operation mode switch scenario according to an embodiment of the present invention.

FIG. 6 is a diagram illustrating a fifth dynamic operation mode switch scenario according to an embodiment of the present invention. In this embodiment, the Wi-Fi MLD 104 may be an AP, the Wi-Fi MLD 102 may be a non-AP STA, and the Wi-Fi MLD 102 on a link may set a default TX NSS=1 and a maximum TX NSS=4. On each link, the Wi-Fi MLD 102 operates under a default mode listening to the channel. The control circuit 116 controls the TX circuit 120 to transmit an RTS frame on a link, and then controls the RX circuit 118 to receive a CTS frame responsive to the RTS frame from Wi-Fi MLD (which is an AP) 104 on the same link, where the RTS/CTS mechanism claims a TXOP for frame exchange. After the CTS frame is received by the RX circuit 118, the control circuit 116 controls the TX circuit 120 to transmit an announcement frame that is used to announce operation mode change for the following period of the TXOP on the link. In this embodiment, the announcement frame carries indication IND of operation mode parameter change that specifies the use of TX NSS=2. In other words, the Wi-Fi MLD 102 will control the TX circuit 120 to switch another TX chain to the link for enhancing the TX NSS capability. The RTS frame and the announcement frame are both transmitted based on the default operation mode parameter (e.g., TX NSS=1). After the RX circuit 118 receives a response frame responsive to the announcement frame from the Wi-Fi MLD (which is an AP) 104, the control circuit 116 controls the TX circuit 120 to operate under a changed operation mode parameter (e.g., TX NSS=2) and other unchanged parameters, and transmit one or more UL PPDUs on the link during a remaining period of the TXOP. Hence, during the remaining period of the TXOP, UL PPDU(s) can be transmitted by TX NSS=2. At an end of the TXOP, the control circuit 116 controls the TX circuit 120 to resume the default operation mode parameter (e.g., TX NSS=1) on the link.

As mentioned above, the CTS frame/response frame is capable of carrying indication of operation mode change. In some embodiments of the present invention, more signaling can be exchanged during the initialization of the period so that efficiency during that period can be further improved. For example, since RX chain switch may require additional sounding to ensure the RX quality, the CTS frame/response frame may further carry a sounding request. For another example, the CTS frame/response frame may further carry an RX chain bitmap that is used for indicating which antennas are used on a certain link for an RX operation and is also used for allowing a sender (which transmits the RTS frame/inquiry frame) to use suitable beamforming parameters derived from previous sounding.

Figure 7:
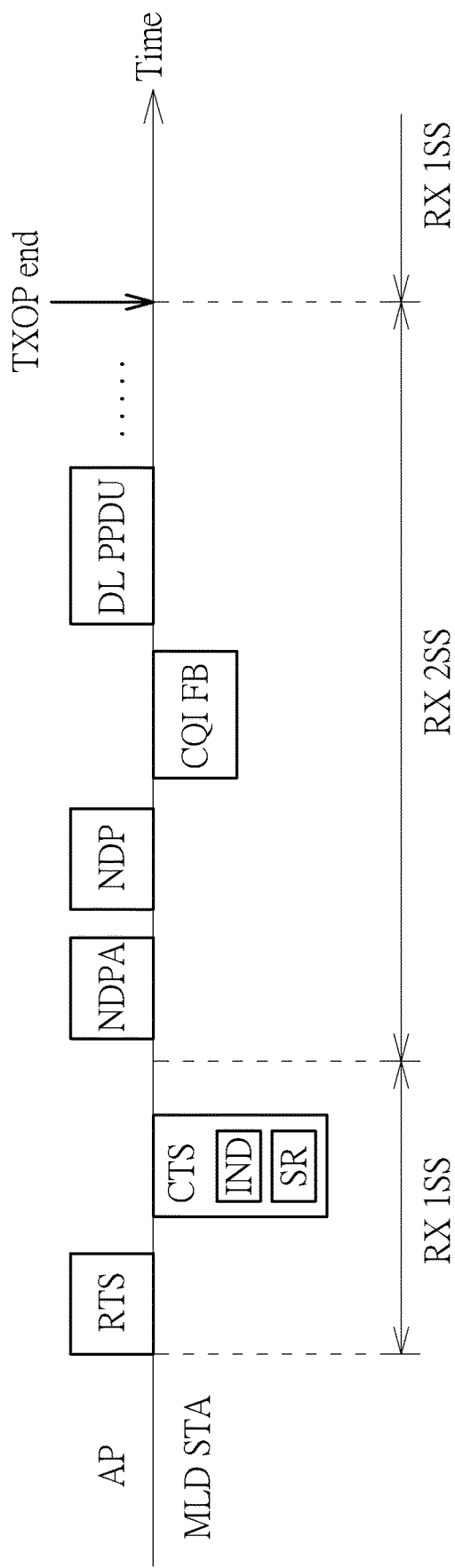
FIG. 7 is a diagram illustrating a sixth dynamic operation mode switch scenario according to an embodiment of the present invention.

FIG. 7 is a diagram illustrating a sixth dynamic operation mode switch scenario according to an embodiment of the present invention. In this embodiment, the Wi-Fi MLD 104 may be an AP, the Wi-Fi MLD 102 may be a non-AP STA, and the Wi-Fi MLD 102 on a link may set a default RX NSS=1 and a maximum RX NSS=4. On each link, the Wi-Fi MLD 102 operates under a default mode listening to the channel. After the RX circuit 118 receives an RTS frame from Wi-Fi MLD (which is an AP) 104 on a link, the control circuit 116 controls the TX circuit 120 to respond with a CTS frame on the same link, where the RTS/CTS mechanism claims a TXOP for frame exchange. The RTS frame is received based on the default operation mode parameter (e.g., RX NSS=1). In this embodiment, the CTS frame carries indication IND of operation mode parameter change that specifies the use of RX NSS=2, and also carries a sounding request SR. After the CTS frame is received by the Wi-Fi MLD (which is an AP) 104, the Wi-Fi MLD 104 accepts the sounding request SR, and then initiates a sounding process by sending a null data packet announcement (NDPA) frame and a null data packet (NDP) frame, and the Wi-Fi MLD (which is a non-AP STA) 102 replies with a channel quality indicator (CQI) feedback (FB) during the sounding process. After the CTS frame is transmitted by the TX circuit 120, the control circuit 116 controls the RX circuit 118 to operate under a changed operation mode parameter (e.g., RX NSS=2) and other unchanged parameters, and receive one or more DL PPDUs on the link during a remaining period of the TXOP. Hence, during the remaining period of the TXOP, DL PPDU(s) can be received by RX NSS=2. At an end of the TXOP, the control circuit 116 controls the RX circuit 118 to resume the default operation mode parameter (e.g., RX NSS=1) on the link.

Figure 8:
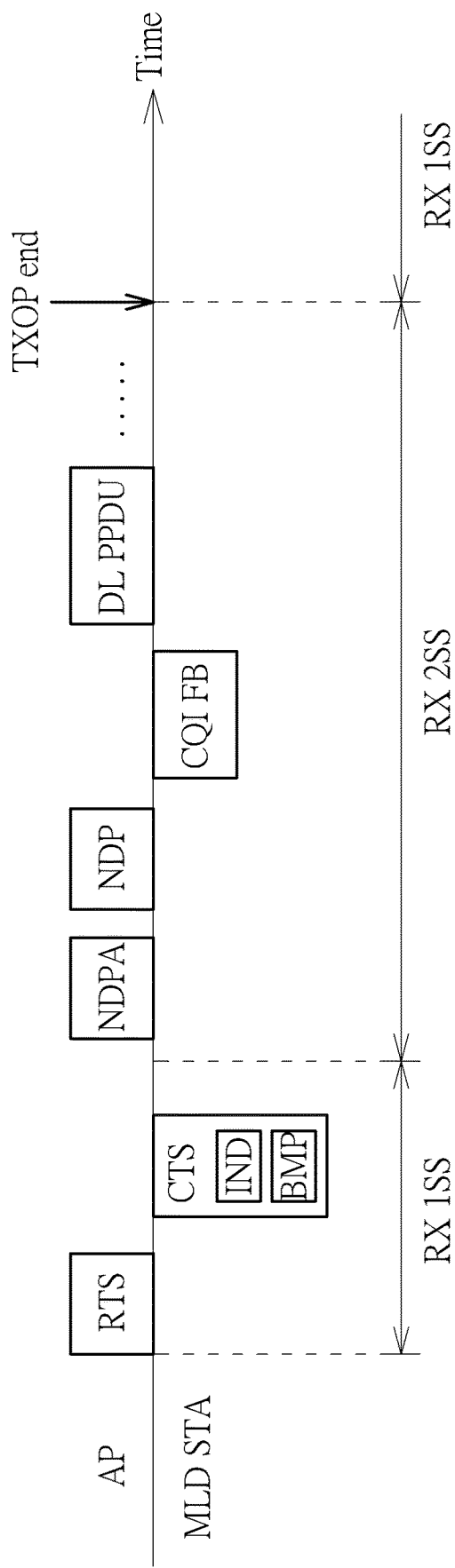
FIG. 8 is a diagram illustrating a seventh dynamic operation mode switch scenario according to an embodiment of the present invention.

FIG. 8 is a diagram illustrating a seventh dynamic operation mode switch scenario according to an embodiment of the present invention. In this embodiment, the Wi-Fi MLD 104 may be an AP, the Wi-Fi MLD 102 may be a non-AP STA, and the Wi-Fi MLD 102 on a link may set a default RX NSS=1 and a maximum RX NSS=4. On each link, the Wi-Fi MLD 102 operates under a default mode listening to the channel. After the RX circuit 118 receives an RTS frame from Wi-Fi MLD (which is an AP) 104 on a link, the control circuit 116 controls the TX circuit 120 to respond with a CTS frame on the same link, where the RTS/CTS mechanism claims a TXOP for frame exchange. The RTS frame is received based on the default operation mode parameter (e.g., RX NSS=1). In this embodiment, the CTS frame carries indication IND of operation mode parameter change that specifies the use of RX NSS=2, and also carries an RX chain bitmap BMP. After the CTS frame received by the Wi-Fi MLD (which is an AP) 104, the Wi-Fi MLD 104 refers to the RX chain bitmap BMP to decide to do sounding, and initiates a sounding process by sending an NDPA frame and an NDP frame, where the RX chain bitmap BMP indicates the RX NSS employed by Wi-Fi MLD (which is a no-AP STA) 102. The Wi-Fi MLD 102 replies with a CQI FB during the sounding process, where the CQI FB is based on the RX bitmap BMP carried in the CTS frame. After the CTS frame is transmitted by the TX circuit 120, the control circuit 116 controls the RX circuit 118 to operate under a changed operation mode parameter (e.g., RX NSS=2) and other unchanged parameters, and receive one or more DL PPDUs on the link during a remaining period of the TXOP. Hence, during the remaining period of the TXOP, DL PPDU(s) can be received by RX NSS=2. At an end of the TXOP, the control circuit 116 controls the RX circuit 118 to resume the default operation mode parameter (e.g., RX NSS=1) on the link.

Figure 9:
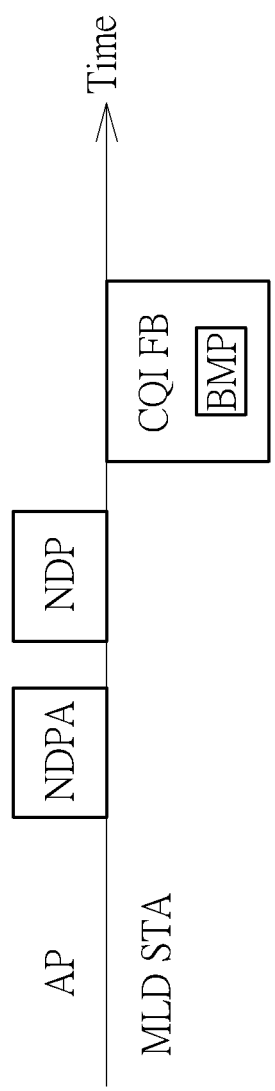
FIG. 9 is a diagram illustrating additional signaling provided by a channel quality indicator feedback according to an embodiment of the present invention.
Figure 10:
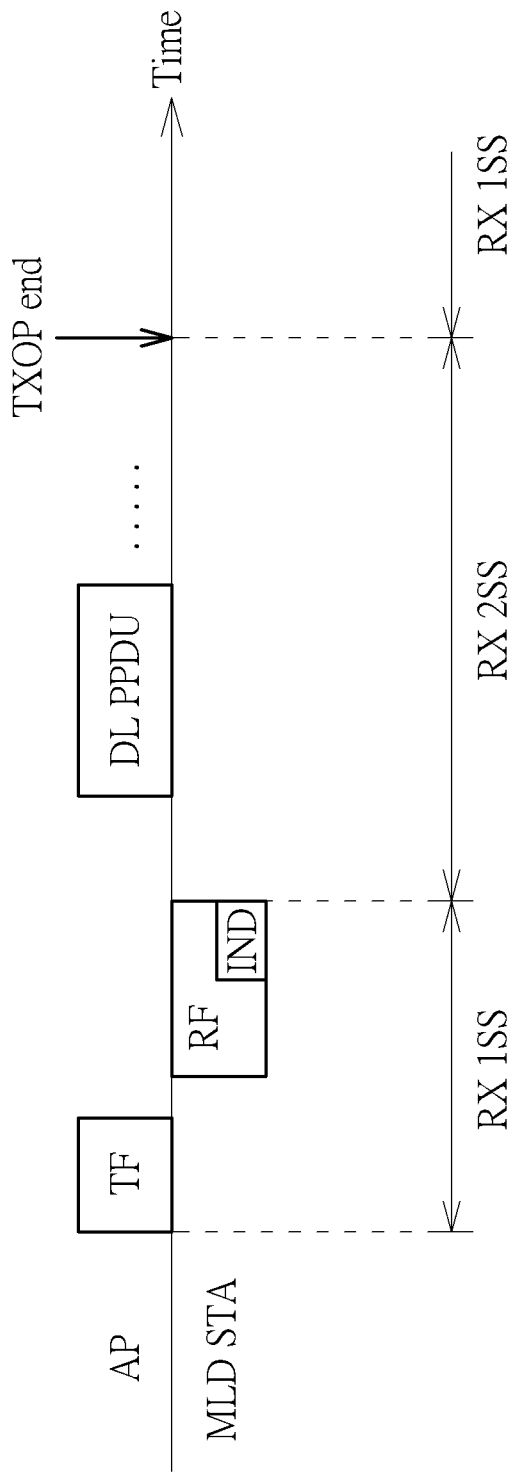
FIG. 10 is a diagram illustrating an alternative design implemented on the basis of the dynamic operation mode switch scenario shown in FIG. 2.
Figure 11:
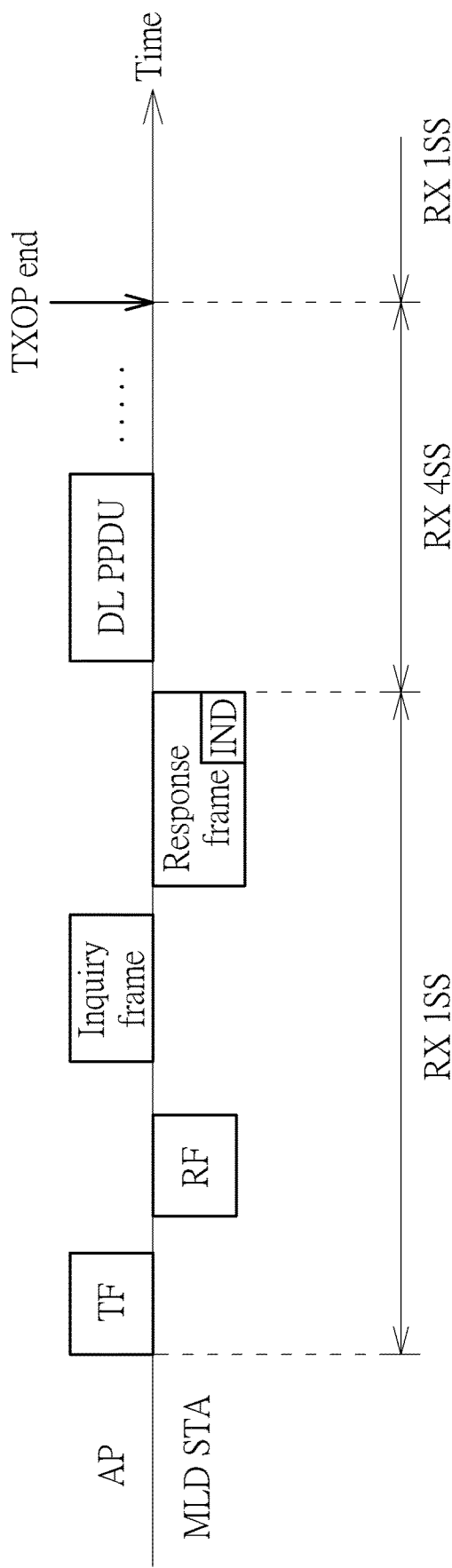
FIG. 11 is a diagram illustrating an alternative design implemented on the basis of the dynamic operation mode switch scenario shown in FIG. 3.
Figure 12:
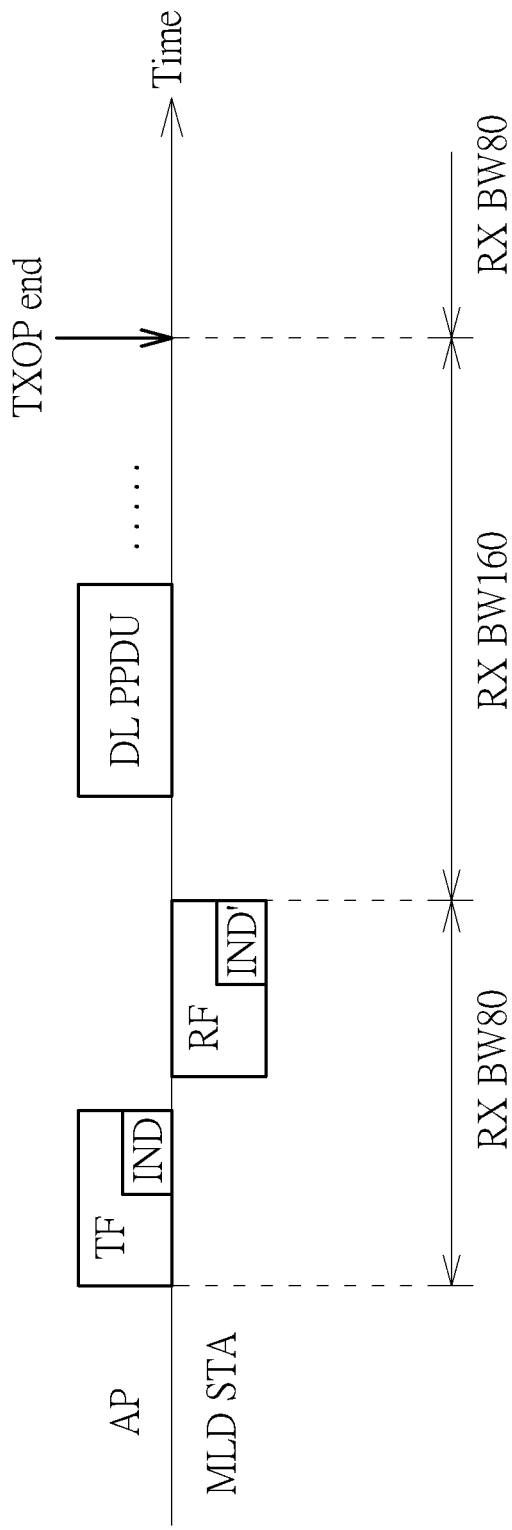
FIG. 12 is a diagram illustrating an alternative design implemented on the basis of the dynamic operation mode switch scenario shown in FIG. 4.
Figure 13:
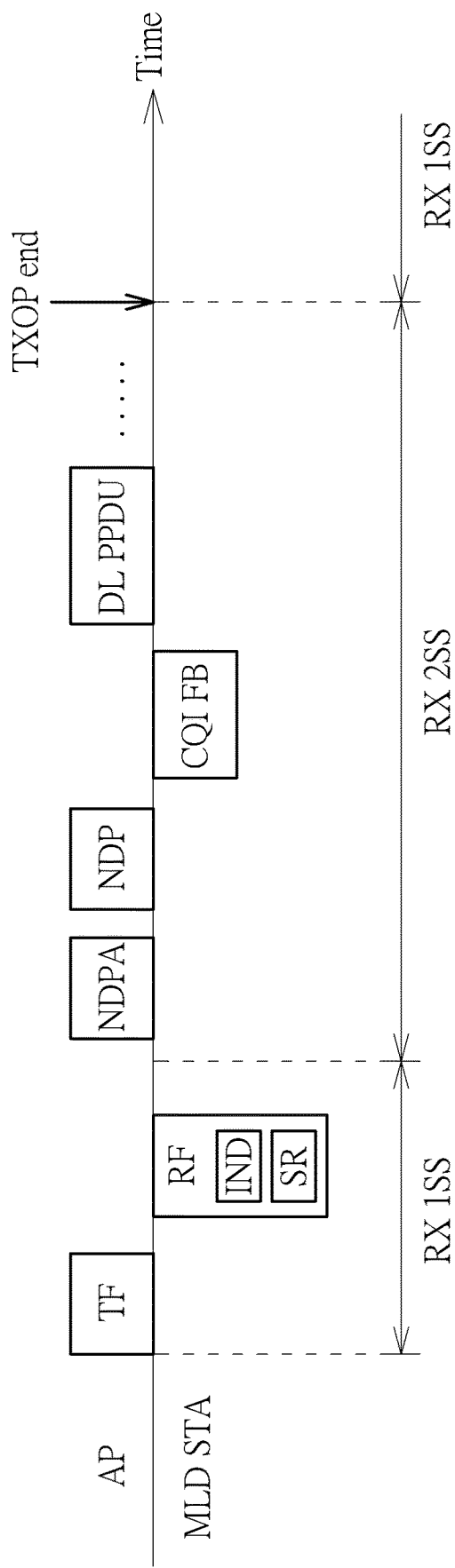
FIG. 13 is a diagram illustrating an alternative design implemented on the basis of the dynamic operation mode switch scenario shown in FIG. 7.
Figure 14:
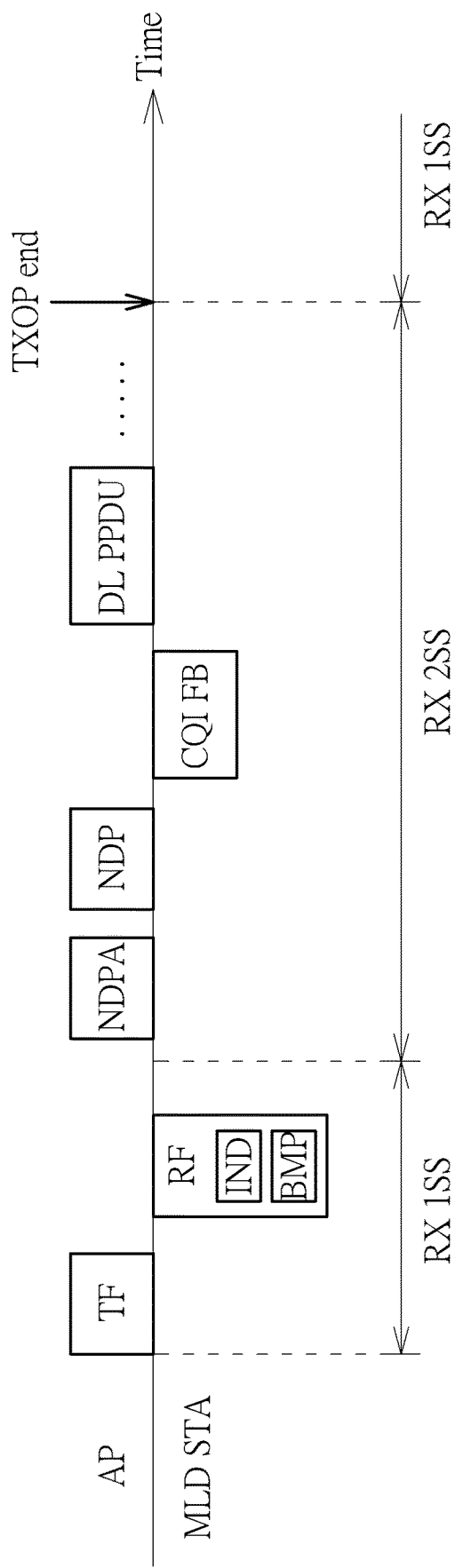
FIG. 14 is a diagram illustrating an alternative design implemented on the basis of the dynamic operation mode switch scenario shown in FIG. 8.

FIG. 9 is a diagram illustrating additional signaling provided by a channel quality indicator feedback according to an embodiment of the present invention. For any sounding process (NDPA+NDP+CQI FB) applied on any link of a multi-link operation (MLO), CQI FB can also carry the RX chain bitmap BMP. In this way, sounding overhead reduction can be achieved if the same RX chains are used on some links in the future.

In above embodiments, an AP MLD uses an RTS frame as an initial Control frame of a frame exchange sequence. However, these are for illustrative purposes only, and are not meant to be limitations of the present invention. In some embodiments of the present invention, the initial Control frame of the frame exchange sequence that is initiated by the AP MLD may be a trigger frame, such as a multi-user request to send (MU-RTS) frame or a buffer status report poll (BSRP) frame. FIGS. 10-14 illustrate additional dynamic operation mode switch scenarios. In a case where the AP MLD (e.g., one of Wi-Fi MLDs 102 and 104 shown in FIG. 1) sends a trigger frame TF being an MU-RTS frame, the non-AP MLD (e.g., the other of Wi-Fi MLDs 102 and 104 shown in FIG. 1) may respond with a response frame RF being a CTS frame after receiving the MU-RTS frame. In another case where the AP MLD (e.g., one of Wi-Fi MLDs 102 and 104 shown in FIG. 1) sends a trigger frame TF being a BSRP frame, the non-AP MLD (e.g., the other of Wi-Fi MLDs 102 and 104 shown in FIG. 1) may respond with a response frame RF being a buffer status report (BSR) frame after receiving the BSRP frame. The operation mode change signaling design employed by the RTS/CTS mechanism may also be employed by the MU-RTS/CTS mechanism and the BSRP/BSR mechanism. Since a person skilled in the art can readily understand details of the dynamic operation mode switch examples shown in FIGS. 10-14 after reading above paragraphs directed to FIGS. 2-4 and 7-8, similar description is omitted here for brevity. It should be noted that one Wi-Fi MLD of the present invention may support one or more of the dynamic operation mode switch scenarios mentioned above.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless fidelity (Wi-Fi) multi-link device (MLD) comprising:
   a transmit (TX) circuit;
   a receive (RX) circuit; and
   a control circuit, arranged to control the RX circuit to receive a first frame under an operation mode parameter with a first setting, control the TX circuit to transmit a second frame responsive to the first frame under the operation mode parameter with the first setting, and after the second frame is transmitted, control the RX circuit to receive at least one physical layer protocol data unit (PPDU) under the operation mode parameter with a second setting, wherein the second setting is different from the first setting;
   wherein during a same transmission opportunity (TXOP), the first frame is received by the Wi-Fi MLD, the second frame is transmitted from the Wi-Fi MLD, and said at least one PPDU is received by the Wi-Fi MLD; and one of the first frame and the second frame carries indication of operation mode parameter change that specifies the use of the second setting.

2. The Wi-Fi MLD of claim 1, wherein the first frame is one of a request to send (RTS) frame, a multi-user request to send (MU-RTS) frame and a buffer status report poll (BSRP) frame, and the second frame is one of a clear to send (CTS) frame and a buffer status report (BSR) frame.

3. The Wi-Fi MLD of claim 2, wherein the second frame further carries a sounding request that is arranged to request for a sounding process involving a null data packet announcement (NDPA) frame, a null data packet (NDP) frame, and a channel quality indicator (CQI) feedback frame.

4. The Wi-Fi MLD of claim 2, wherein the second frame further carries an RX chain bitmap that is used for indicating which antennas are used on a certain link for an RX operation.

5. The Wi-Fi MLD of claim 1, wherein before the first frame is received, the control circuit is further arranged to control the RX circuit to receive a third frame under the operation mode parameter with the first setting, and control the TX circuit to transmit a fourth frame responsive to the third frame under the operation mode parameter with the first setting; and
   wherein the first frame is an inquiry frame, and the second frame is a response frame that is responsive to the inquiry frame and carries indication of operation mode parameter change that specifies the use of the second setting; and
   wherein the third frame is one of a request to send (RTS) frame, a multi-user request to send (MU-RTS) frame and a buffer status report poll (BSRP) frame, and the fourth frame is one of a clear to send (CTS) frame and a buffer status report (BSR) frame.

6. The Wi-Fi MLD of claim 5, wherein the response frame further carries a sounding request that is arranged to request for a sounding process involving a null data packet announcement (NDPA) frame, a null data packet (NDP) frame, and a channel quality indicator (CQI) feedback frame.

7. The Wi-Fi MLD of claim 5, wherein the response frame further carries an RX chain bitmap that is used for indicating which antennas are used on a certain link for an RX operation.

8. The Wi-Fi MLD of claim 1, wherein the control circuit is further arranged to control the TX circuit to transmit a channel quality indicator (CQI) feedback frame during a sounding process, the sounding process involves a null data packet announcement (NDPA) frame, a null data packet (NDP) frame, and the CQI feedback frame, and the CQI feedback frame carries an RX chain bitmap that is used for indicating which antennas are used on a certain link for an RX operation.

9. The Wi-Fi MLD of claim 1, wherein the operation mode parameter is a number of spatial streams, a bandwidth, a decoding capability, a maximum media access control protocol data unit (MPDU) length, a maximum aggregate media access control service data unit (A-MSDU) length, or a maximum aggregate media access control protocol data unit (A-MPDU) length exponent.

10. The Wi-Fi MLD of claim 1, wherein the control circuit is further arranged to control the RX circuit to resume the operation mode parameter with the first setting at an end of the same TXOP.

11. A wireless fidelity (Wi-Fi) multi-link device (MLD) comprising:
    a transmit (TX) circuit;
    a receive (RX) circuit; and
    a control circuit, arranged to control the TX circuit to transmit a first frame under an operation mode parameter with a first setting, control the RX circuit to receive a second frame responsive to the first frame under the operation mode parameter with the first setting, and after the second frame is received, control the TX circuit to transmit at least one physical layer protocol data unit (PPDU) under the operation mode parameter with a second setting, wherein the second setting is different from the first setting;
    wherein during a same transmission opportunity (TXOP), the first frame is transmitted from the Wi-Fi MLD, the second frame is received by the Wi-Fi MLD, and said at least one PPDU is transmitted from the Wi-Fi MLD; and the first frame carries indication of operation mode parameter change that specifies the use of the second setting.

12. The Wi-Fi MLD of claim 11, wherein the first frame is a request to send (RTS) frame, and the second frame is a clear to send (CTS) frame.

13. The Wi-Fi MLD of claim 12, wherein the RTS frame carries indication of operation mode parameter change that specifies the use of the second setting.

14. The Wi-Fi MLD of claim 12, wherein the RTS frame does not carry indication of operation mode parameter change that specifies the use of the second setting.

15. The Wi-Fi MLD of claim 11, wherein before the first frame is transmitted, the control circuit is further arranged to control the TX circuit to transmit a request to send (RTS) frame under the operation mode parameter with the first setting, and control the RX circuit to receive a clear to send (CTS) frame responsive to the RTS frame under the operation mode parameter with the first setting; the first frame is an announcement frame carrying indication of operation mode parameter change that specifies the use of the second setting, and the second frame is a response frame responsive to the announcement frame.

16. The Wi-Fi MLD of claim 11, wherein the operation mode parameter is a number of spatial streams, a bandwidth, a decoding capability, a maximum media access control protocol data unit (MPDU) length, a maximum aggregate media access control service data unit (A-MSDU) length, or a maximum aggregate media access control protocol data unit (A-MPDU) length exponent.

17. The Wi-Fi MLD of claim 11, wherein the control circuit is further arranged to control the TX circuit to resume the operation mode parameter with the first setting at an end of the same TXOP.

18. A wireless communication method employed by a wireless fidelity (Wi-Fi) multi-link device (MLD), comprising:

controlling a receive (RX) circuit to receive a first frame under a first operation mode parameter with a first setting;

controlling a transmit (TX) circuit to transmit a second frame responsive to the first frame under the first operation mode parameter with the first setting;

after the second frame is transmitted, controlling the RX circuit to receive at least one first physical layer protocol data unit (PPDU) under the first operation mode parameter with a second setting, wherein the second setting is different from the first setting;

controlling the TX circuit to transmit a third frame under a second operation mode parameter with a third setting;

controlling the RX circuit to receive a fourth frame responsive to the third frame under the second operation mode parameter with the third setting; and after the fourth frame is received, controlling the TX circuit to transmit at least one second PPDU under the second operation mode parameter with a fourth setting, wherein the fourth setting is different from the third setting;

wherein during a same first transmission opportunity (TXOP), the first frame is received by the Wi-Fi MLD, the second frame is transmitted from the Wi-Fi MLD, and said at least one first PPDU is received by the Wi-Fi MLD; and one of the first frame and the second frame carries indication of operation mode parameter change that specifies the use of the second setting; and wherein during a same second TXOP, the third frame is transmitted from the Wi-Fi MLD, the fourth frame is received by the Wi-Fi MLD, and said at least one second PPDU is transmitted from the Wi-Fi MLD; and the third frame carries indication of operation mode parameter change that specifies the use of the fourth setting.

* * * * *